Nov. 8, 1927.  1,648,535

E. L. BROOME

SEALING DEVICE FOR HYDRAULIC GATES

Filed Feb. 17, 1927   2 Sheets-Sheet 1

Witnesses
C. L. McDonald
E. N. Lovewell

Inventor
Ernest L. Broome
By
Attorney

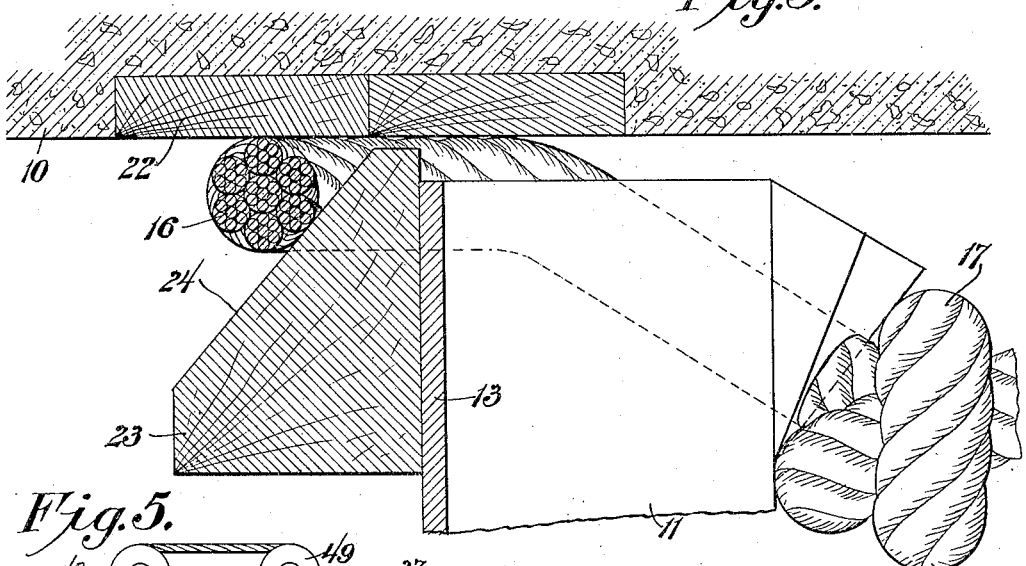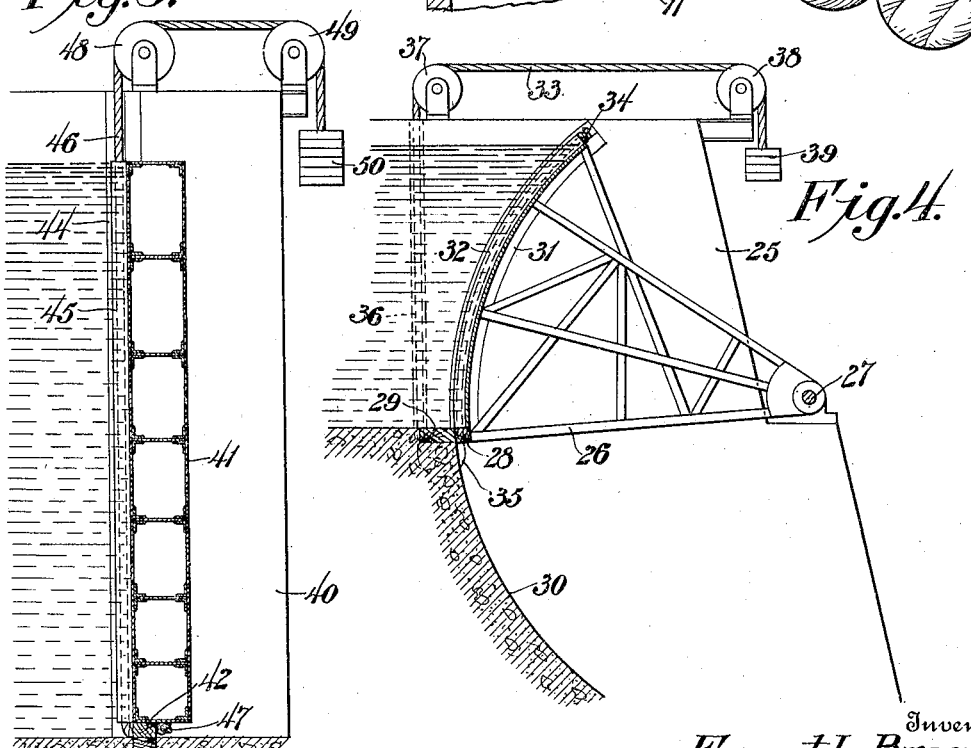

Patented Nov. 8, 1927.

1,648,535

UNITED STATES PATENT OFFICE.

ERNEST L. BROOME, OF TARRYTOWN, NEW YORK.

SEALING DEVICE FOR HYDRAULIC GATES.

Application filed February 17, 1927. Serial No. 169,066.

This invention relates to a sealing device adapted to be used in connection with hydraulic gates of various types used in controlling the flow of water from dams, and similar structures wherein the gates have an up and down or rotary movement.

The object of the invention is to provide a flexible seal for closing the space between the movable gate and the sides of the gate opening, which will insure the minimum leakage with the least possible damage from abrasion to the flexible seal, which flexible seal being under constant tension due to the action of the counterweight will automatically be laid in operative relation to the sides of the opening and withdrawn therefrom as the gate is shut and opened, said seal readily adapting itself to the contour of the opening. The tensional force in the present device is supplied by counterweights, and the same may be used in connection with the ordinary counterweights, such as are often used to aid in the operation of gates of this character, or in lieu thereof.

The specific construction of the invention and the advantages resulting therefrom will be more particularly explained in connection with the accompanying drawings illustrating the same.

In the drawings:

Figure 3 is an enlarged horizontal section through one side of the gate and the adjacent masonry, showing the flexible seal in place.

Figure 4 is a view similar to Figure 1, but showing the invention applied to a different type of gate.

Figure 5 is a similar view showing the invention applied to still another type of gate.

Figure 1:
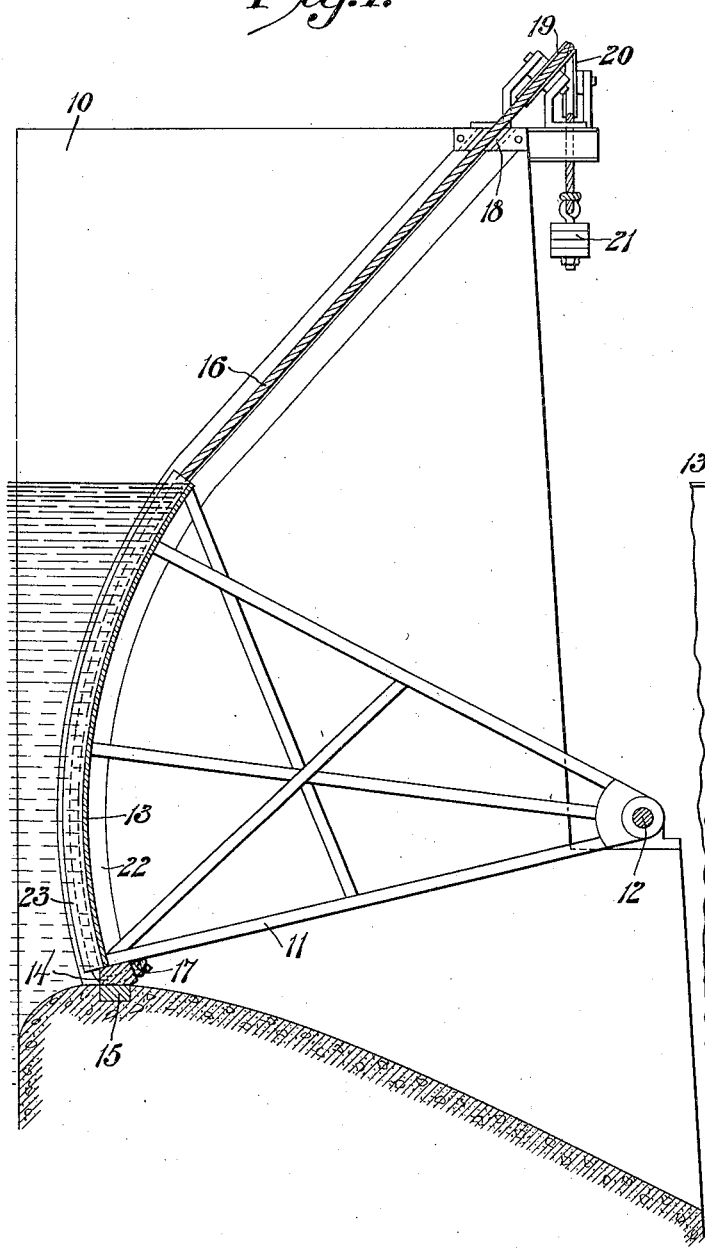
Figure 1 is a vertical cross section of one type of hydraulic gate showing the application of my invention.
Figure 2:
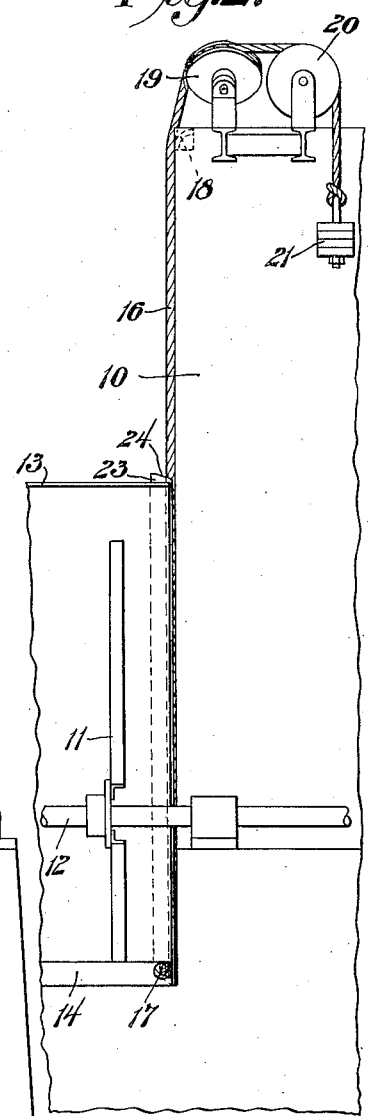
Figure 2 is a partial down stream elevation of the same.

In Figures 1, 2 and 3, the invention is illustrated in connection with a dam construction 10, having an opening provided with a gate 11, pivoted to swing upwardly about an axis 12 when opening. This gate is provided with the usual curved cylindrical surface 13, with the convex face disposed toward the impounded water. When the gate is closed, its lower edge 14 usually rests upon a smooth seat 15, formed by a strip of wood or metal set in the concrete or masonry base.

This invention comprises a flexible element 16, which may be in the form of a rope, or it may be composed, partly or wholly, of rubber, rubber fabric, or similar material. The lower end of this flexible element passes through an opening in the lower edge 14 of the gate, which is just large enough to receive it, and is provided with a knot 17, or equivalent means, to prevent it from pulling out. The flexible element 16 extends along the edge of the curved surface 13, and thence in a straight line over a chafing iron 18, or other guiding means located at the upper edge of the masonry, and over suitable sheaves 19 and 20 supported above the masonry. Weights 21 are secured to the upper end of the rope, and serve to keep the latter taut, as well as to assist in raising the gate. It is understood, of course, that there is one of these flexible elements at each side of the gate.

In order to provide a smooth surface for engagement by the seal, a strip 22, of wood or metal, is set in the masonry. The adjacent edge of the gate is provided with a chock 23, having an inclined surface 24, which cooperates with the surface 22 to provide a wedge-shaped seat into which the sealing element 16 is forced by the pressure of the water, thus forming a substantially leak-proof seal. As the gate is raised, the sealing element is progressively drawn away from the surface of the gate, so that there is a minimum frictional resistance offered to the movement of the gate. As soon as the gate is lowered again, the sealing element is automatically drawn into the space between the chock 23 and the surface 22, and again forms an effective seal.

In Figure 4, the invention is shown in connection with a dam 25, having an opening controlled by a gate 26, which opens by swinging downwardly about an axis 27. When the gate is closed, its lower edge 28 engages a seat 29 set in the lower edge of the opening. The side of the opening has a smooth surface 31 of wood or metal adjacent to which the gate is provided with a chock 32. A flexible sealing element 33 is secured by a knot 34, or the like, to the upper corner of the gate, and passes thence downwardly between the surface 31 and the chock 32, and about a sheave 35 mounted near the lower edge of the opening. From the sheave 35, the sealing element passes upwardly through a tube or groove 36 in the side of the masonry, and over sheaves 37 and 38. Weights 39 are secured to the end of the seal element to hold the same taut. It will be seen, therefore, that the action of the sealing element in this type of gate is substantially the same as in the type shown in Figures 1, 2 and 3.

In Figure 5, the invention is used in connection with a dam 40, having an opening which is controlled by a vertically movable gate 41. When the gate is closed, its lower edge 42 rests upon a smooth seat 43 set in the masonry, and a vertical strip 44, at the side of the opening, cooperates with a chock 45 carried by the adjacent edge of the gate to form a seat for the sealing element 46, which is similar to the sealing element used in connection with the other types of gates. The lower end of the sealing element 46 is anchored in the lower edge of the gate by a knot 47, or equivalent means, and passes upwardly at the edge of the gate, and over sheaves 48 and 49 supported above the surface of the masonry. Weights 50 are connected to the upper end of the sealing element 46, and serve to hold the latter taut, as well as to assist in raising the gate.

From the foregoing description, it will be apparent that I have provided a sealing device, which is capable of use on many types of hydraulic gates, and which will be automatically drawn into the angle between the gate and the fixed surface of the opening as rapidly as the gate is closed. The pressure of the water itself serves to force the seal more tightly into contact with the adjacent surfaces, and to prevent leakage.

It will, of course, be understood that the manner in which the seal is mounted, and the means by which it is connected to the gate, may be considerably modified without any material departure from the essential features of the invention. The invention is adapted to be used with many types of hydraulic gates, and the flexible seal and counterweight connected therewith may be combined with any of the usual counterweight systems used in the operation of gates without affecting the essential characters of the invention. It is my intention, therefore, to include all such modifications as fall within the scope of the appended claims.

What is claimed is:

1. The combination with a hydraulic gate movable up and down between fixed upright surfaces, of a flexible sealing element connected to the gate, and means for laying said flexible element along the crack at the edge of the gate as the latter is closed so that water pressure will force it against the crack to form an effective seal, and for withdrawing said flexible element from the crack as the gate is opened.

2. The combination with a hydraulic gate movable up and down between fixed upright surfaces, of a flexible sealing element connected at one end to the corner of the gate, and means for constantly tensioning said element and progressively laying it along the crack at the edge of the gate as the latter is closed so that the water pressure will force it against the crack to form an effective seal, said means being also operable to progressively withdraw the flexible element from the crack as the gate is opened.

3. The combination with a hydraulic gate movable up and down between fixed upright surfaces, of a flexible sealing element connected at one end to the corner of the gate, a counterweight attached to the other end of the flexible element to maintain the latter under constant tension, and a revoluble element about which the intermediate portion of the flexible element passes, said revoluble element being supported on a fixed base in such a position that the flexible element is laid along the crack at the edge of the gate as the latter is closed so that the water pressure will force it against the crack to form an effective seal, said flexible element being withdrawn from the crack as the gate is opened.

4. The combination with a structure having an opening with upright surfaces at the sides thereof and a gate for closing said opening, of a sealing element, and means controlled by the movement of the gate for laying the sealing element in front of the crack between the gate and the adjacent upright surface as the gate closes and operable upon the opening of the gate to withdraw said sealing element.

5. The combination with a structure having an opening with upright surfaces at the sides thereof, a gate for closing said opening, and a chock attached to the side of the gate and having an inclined face converging outwardly toward the adjacent upright surface, of a sealing element, and means controlled by the movement of the gate to lay the sealing element between the chock and adjacent edge of the opening as the gate closes and to withdraw said sealing element as the gate opens.

6. The combination with a hydraulic gate movable up and down between fixed upright surfaces, and a chock attached to the side of the gate and having an inclined face converging outwardly toward the adjacent upright surface, of a flexible sealing element connected to the gate, and means for laying said flexible element between the chock and the adjacent fixed surface as the gate is closed and for withdrawing said flexible element as the gate is opened.

7. The combination with a hydraulic gate movable up and down between fixed upright surfaces, and a chock attached to the side of the gate and having an inclined face converging outwardly toward the adjacent upright surface, of a flexible sealing element connected at one end to the corner of the gate, and means for constantly tensioning said element and progressively laying it between the chock and the adjacent fixed surface as the gate is closed, said means being also operable to withdraw the flexible element as the gate is opened.

8. The combination with a hydraulic gate movable up and down between fixed upright surfaces, and a chock attached to the side of the gate and having an inclined face converging outwardly toward the adjacent upright surface, of a flexible sealing element connected at one end to the corner of the gate, a counterweight attached to the other end of the flexible element to maintain the latter under constant tension, and a revoluble element about which the intermediate portion of the flexible element passes, said revoluble element being supported on a fixed base in such a position that the flexible element is laid between the chock and the adjacent fixed surface as the gate is closed and is withdrawn therefrom as the gate is opened.

In testimony, that I claim the foregoing as my own, I have hereto affixed my signature.

ERNEST L. BROOME.